(No Model.)

D. BROOKS, Jr.
SUPPORT FOR ELECTRIC WIRES.

No. 383,097. Patented May 22, 1888.

WITNESSES:
A. P. Grant,
L. Douville

INVENTOR:
David Brooks Jr.
BY John A. Wiederscheim
ATTORNEY.

UNITED STATES PATENT OFFICE.

DAVID BROOKS, JR., OF PHILADELPHIA, PENNSYLVANIA, ASSIGNOR TO THE ELECTRIC CABLE CONSTRUCTION AND MAINTENANCE COMPANY, OF SAME PLACE.

SUPPORT FOR ELECTRIC WIRES.

SPECIFICATION forming part of Letters Patent No. 383,097, dated May 22, 1888.

Application filed December 4, 1886. Renewed March 3, 1888. Serial No. 266,100. (No model.)

*To all whom it may concern:*

Be it known that I, DAVID BROOKS, Jr., a citizen of the United States, residing in the city and county of Philadelphia, State of Pennsylvania, have invented a new and useful Improvement in Supports for Electric Wires, which improvement is fully set forth in the following specification and accompanying drawings, in which—

Figure 1:
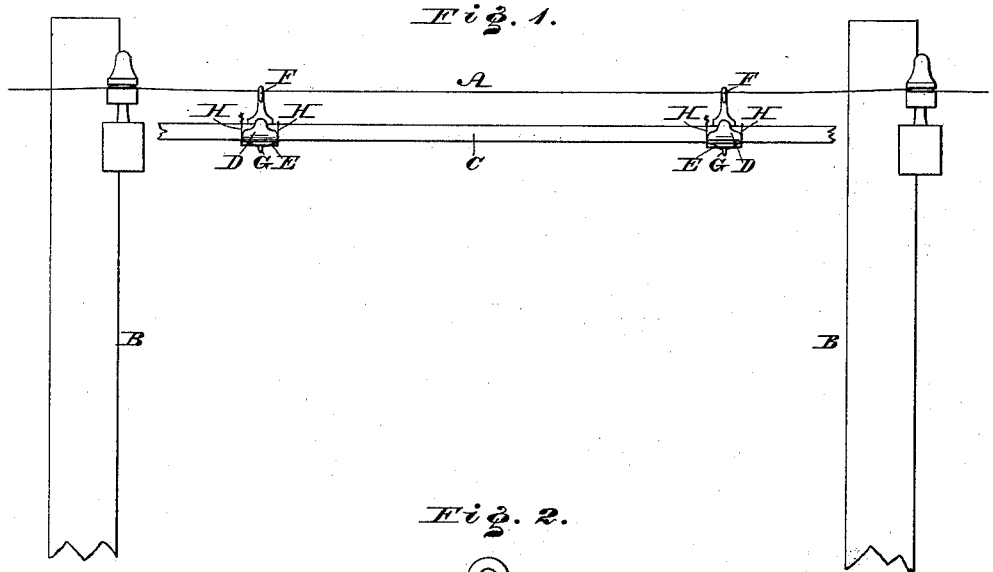
Figure 2:
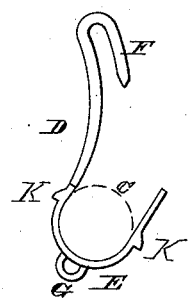
Figure 3:
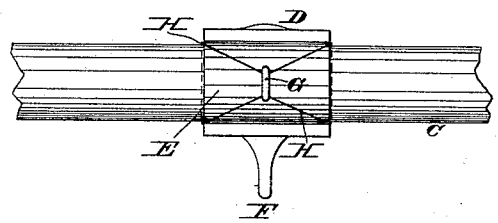

Figure 1 represents a side elevation of a support for electric wires embodying my invention. Fig. 2 represents an end elevation of a detached portion thereof on an enlarged scale. Fig. 3 represents a bottom view thereof.

Similar letters of reference indicate corresponding parts in the several figures.

My invention consists of a hanger or support for electric wires, as will be hereinafter fully set forth.

Referring to the drawings, A represents a suspension-wire, and B the poles supporting the same.

C represents a cable which is sustained on hangers D, the latter depending from the wire A.

The hanger is constructed of metal, and consists of the base or bed E, the same being bent or curved to receive the cable, and the top hooked part, F, which is attached to the wire A. On the under side of the bed E, and preferably near the center thereof, is an eye, G, and on each side of the bottom are shoulders K. Through the said eye G is passed a wire, H, which is bent or tied around said bed, engaging with the shoulders K, the latter serving to prevent the wire from slipping at the ends of the bed. The wire is also passed around the adjacent parts of the cable and the ends secured together by twisting or otherwise, by which means the support is reliably secured in position.

It will be seen that the cable is firmly connected with the hangers by means of the wire, and thus prevented from vertical and lateral displacements therefrom, the wire being also securely retained on the hanger, owing to the eye G.

In laying the cable a rope may be attached thereto and the cable drawn along, the hangers being attached at intervals to the cable and hooked on the wire A and sliding on the latter. A workman will be stationed at each pole, so as to remove the hangers from the wire A as they reach said pole and reapply them to said wire on the other side of the pole, and thus the cable may be conveniently run out, while the weight of the same is sustained by the wire A, the operation thus being performed in a convenient and comparatively easy manner.

I am aware that hangers for electric cables formed of a hook portion and a bed are old; also, that it is not new to provide the bed with a buckle or loop for adjusting the size thereof to that of the cable, and therefore do not claim the same.

Having thus described my invention, what I claim as new, and desire to secure by Letters Patent, is—

1. A support for an electric cable, formed of a hanger having a bed with a hook at the top and an eye at the bottom, said eye being adapted for the attachment of a tie-wire, the parts being combined and operating substantially as described.

2. A support for an electric wire or cable, having a hanger formed of a hook at the top and a bed with shoulders on its under side, substantially as described.

3. A hanger for an electric wire or cable, formed with a bed having an eye for attaching a tie-wire, substantially as described,

DAVID BROOKS, JUNR.

Witnesses:
JOHN A. WIEDERSHEIM,
A. P. GRANT.